United States Patent [19]

Varel

[11] 4,333,364

[45] Jun. 8, 1982

[54] METHOD FOR MANUFACTURING A ROTARY DRILL BIT HAVING A SOLID FORGED, UNITARY BODY

[75] Inventor: Daniel W. Varel, Dallas, Tex.

[73] Assignee: Varel Manufacturing Company, Dallas, Tex.

[21] Appl. No.: 138,079

[22] Filed: Apr. 7, 1980

[51] Int. Cl.³ .................. B21K 5/02; E21B 9/08
[52] U.S. Cl. .................................................. 76/108 A
[58] Field of Search ............ 76/108 A, 108 R, 101 A, 76/101 R, 101 E, DIG. 5; 175/366–369, 412, 413, 375, 332, 339, 340, 371, 372, 374; 219/121 EB, 121 EC, 121 ED, 121 EM, 148, 121 M; 308/8.2

[56] References Cited

U.S. PATENT DOCUMENTS

| | | | |
|---|---|---|---|
| 2,124,521 | 7/1938 | Williams et al. | 175/366 |
| 2,644,671 | 7/1953 | Ingram | 175/375 |
| 3,420,324 | 1/1969 | Vesper | 175/339 |
| 3,850,256 | 11/1974 | McQueen | 76/108 A |
| 4,043,411 | 8/1977 | Lichte | 76/108 A |
| 4,098,150 | 7/1978 | Penny | 76/108 A |
| 4,127,043 | 11/1978 | Evans | 76/108 A |
| 4,187,743 | 2/1980 | Thomas | 76/108 A |

Primary Examiner—Roscoe V. Parker
Attorney, Agent, or Firm—Richards, Harris & Medlock

[57] ABSTRACT

A rotary drill bit for use on a rotating drill string includes a solid forged unitary main body having a plurality of downwardly facing hemi-cylindrical body surfaces. A plurality of cutter bases are provided, each cutter base including an upwardly facing hemi-cylindrical base surface that is fused to one of the body surfaces by electron beam welding. Each cutter base includes a bearing pin extending inwardly with respect to the bit. A cone shaped cutter is rotatably mounted on the bearing pin for rotating about the bearing pin during drilling operations to bore through earth formations.

5 Claims, 4 Drawing Figures

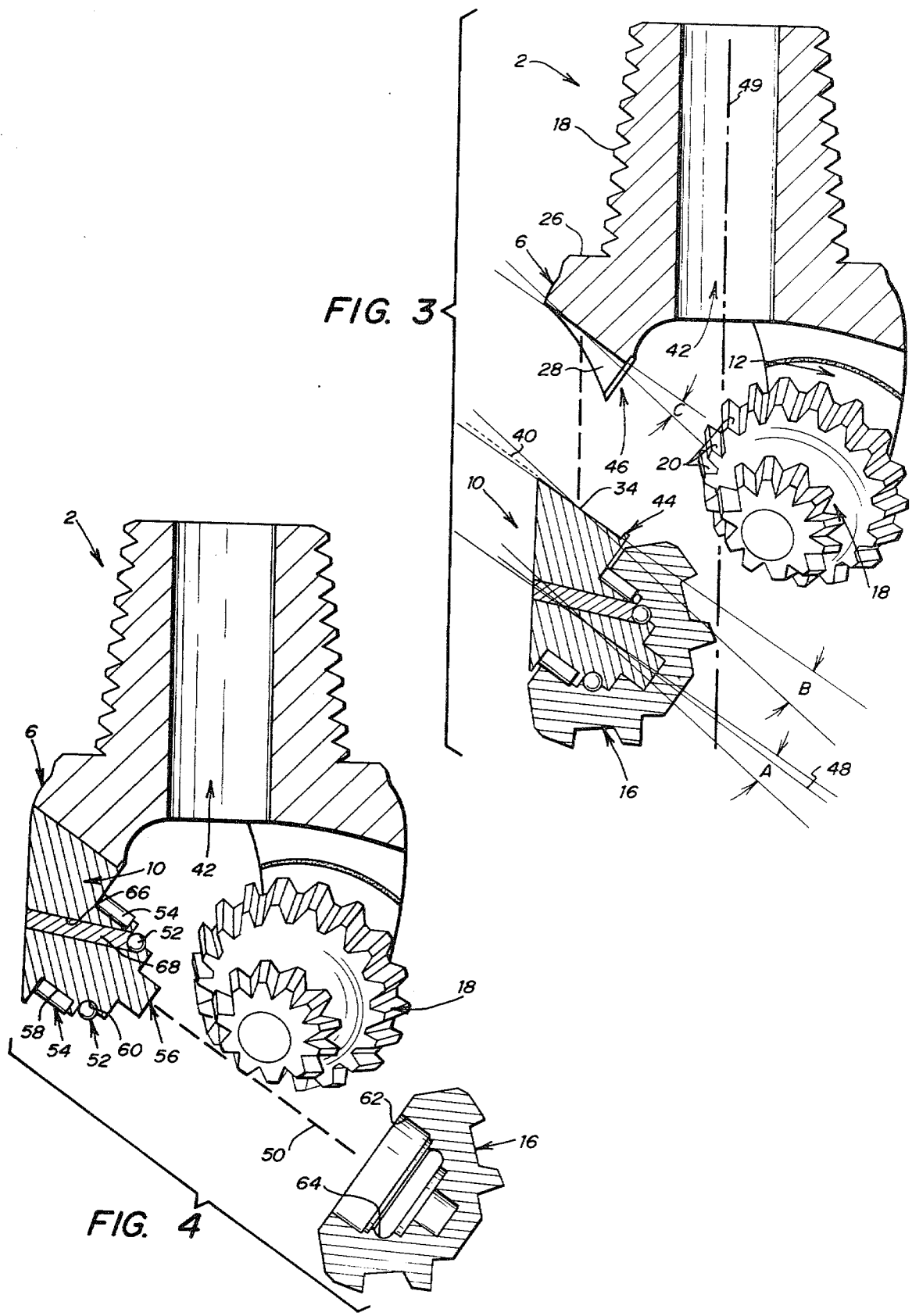

METHOD FOR MANUFACTURING A ROTARY DRILL BIT HAVING A SOLID FORGED, UNITARY BODY

This is a division of application Ser. No. 907,485 filed May 19, 1978 now U.S. Pat. No. 4,256,194.

FIELD OF THE INVENTION

The present invention relates to earth boring bits and more particularly to rotary earth boring bits having rotating cutters.

BACKGROUND OF THE INVENTION

Heretofore, one type of conventional rotary earth boring bits having rotating cutters has been constructed from a multiplicity of arms. Typically, each arm includes a bearing pin extending from a lower end of the arm and two longitudinal surfaces extending along two sides of each arm. A cone shaped cutter is rotatably mounted on the bearing pin of each arm, and usually three arms are positioned side-by-side in a circular configuration with the longitudinal surfaces of each arm being in an abutting relationship with a mating longitudinal surface on the two remaining arms. The arms are then welded together along the abutting longitudinal surfaces. The upper end, opposite the cutters, is threaded for attachment to a drill string.

This conventional method of constructing a drill bit using three separate arms is used, at least in part, to facilitate the mounting of the rotating cutters on the bit. If the arms were welded together before the cutters were mounted, the angle of the bearing pin and the size of the cutters would make it impossible to mount three cutters on the bearing rods. However, the conventional method of construction using a multiplicity of separate arms restricts the type of steel that may be used in the construction of the drill bit. The entire arm must be made from a grade of steel having strength and hardness to meet the requirements of the bearing pin.

Additionally, this conventional construction restricts the accuracy with which the cutters may be positioned relative to one another. Even though each arm may be manufactured to very accurate tolerances, an additional positioning error is introduced when the arms are welded together, thereby compounding the error tolerances of the two processes. Also, the longitudinal weld grooves in conventional drill bits complicate the process of threading the bit for attachment to a drill string. Often, it is necessary to take preparatory measures, such as annealing before threading the conventional bit.

Thus, a need has arisen for a rotary earth boring bit that may be constructed inexpensively of a variety of steel grades. A need has also arisen for a rotary earth boring bit having a solid forged unitary body that does not have longitudinal weld grooves as found in conventional drilling bits constructed from a plurality of arms.

SUMMARY OF THE INVENTION

The rotary drill bit of the present invention includes a solid forged, unitary main body having a plurality of generally downwardly facing hemi-cylindrical body surfaces. The main body includes an upper portion adapted for attachment to a rotating drill string. A plurality of cutter bases are provided, one for each of the body surfaces, with each cutter base having a generally upwardly facing hemi-cylindrical base surface. A cutter base is mounted on each body surface with the base surface in an abutting, attached relationship with the body surface. A bearing pin extends downwardly and inwardly with respect to the bit from each cutter base, and a cutter is rotatably mounted on each bearing pin. The cutter rotates on the bearing pin during drilling operations to cut through earth formations.

In one embodiment of the present invention, the body surfaces are welded to the base surfaces by a beam of energy such as an electron beam. In order to prevent the beam from damaging the cutters during the welding operation, a shoulder is provided on the cutter base adjacent the base surface.

In another embodiment of the present invention, the main body is forged without the upper portion for attachment to the drill string. A threaded pin is provided for threadedly attaching the drill bit to the drill string, and the lower surface of the pin is welded to the main body of the drill bit.

The angle of the axis of rotation and the cutting angle of the cutter may be varied in the present invention by changing the inclination angle of the base surface, the body surface or both surfaces. In this manner, the drill bit of the present invention may be easily modified to accommodate a variety of cutters.

BRIEF DESCRIPTION OF THE DRAWINGS

The advantages and various embodiments of the present invention will be readily appreciated by those of ordinary skill in the art as the same becomes better understood by reference to the following detailed description when considered in connection with the accompanying drawings in which:

FIG. 3 is a cross section of the drill bit taken along the line 3—3 of FIG. 1 with one cutter base and cutter detached from the main body of the bit; and FIG. 4 is a cross section of the drill bit taken along the line 3—3 of FIG. 1 with a cutter removed from the cutter base.

DETAILED DESCRIPTION OF THE PREFERRED EMBODIMENT

Figures 1, 2:
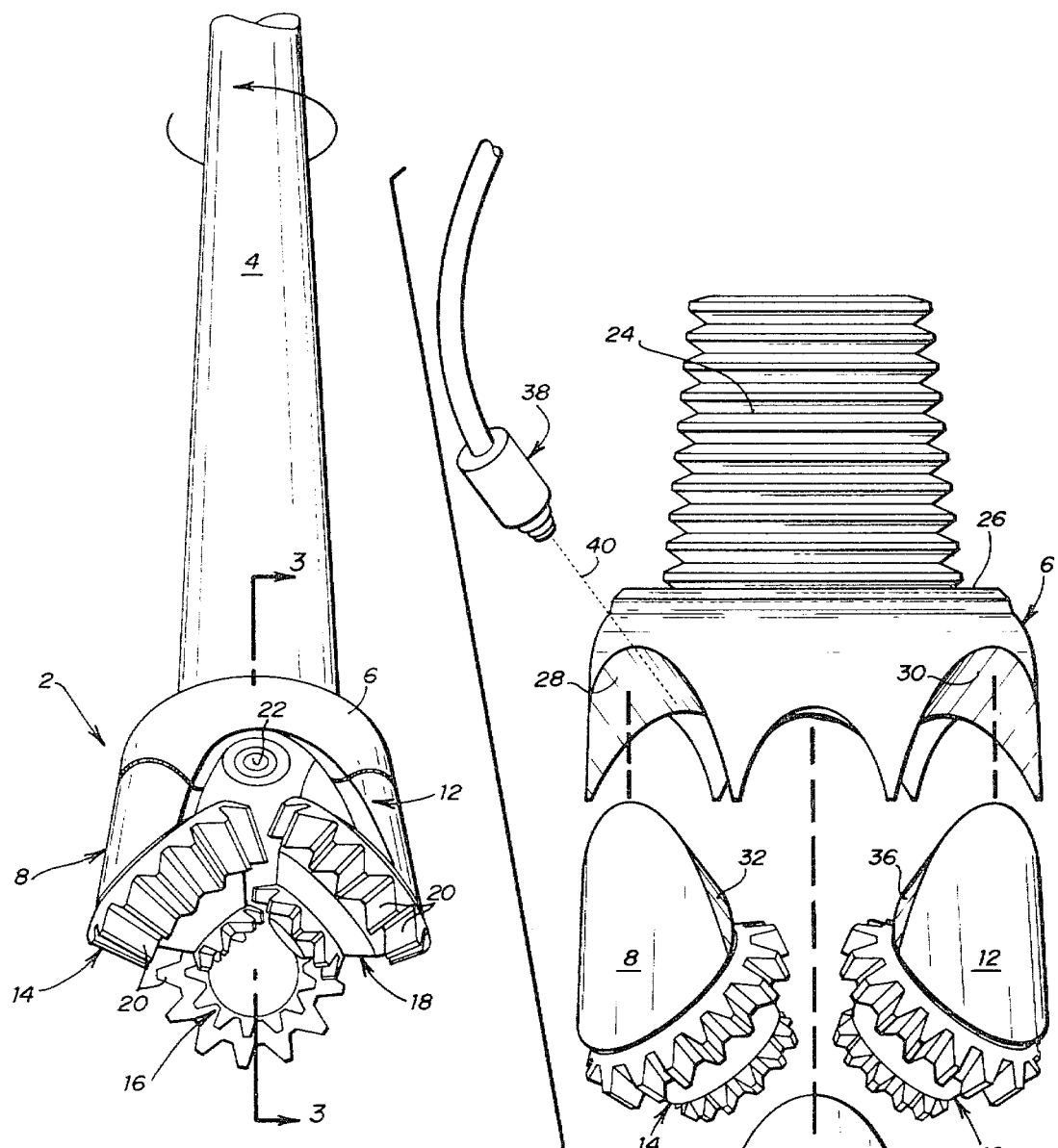
FIG. 1 is a view of a rotary earth boring bit in embodying the present invention attached to the end of a drill string.
FIG. 2 is an exploded view of a rotary earth boring bit showing cutter bases and cutters detached from the main body of the bit.

Referring now to the drawings, wherein like reference characters designate like or corresponding parts throughout several views, there is shown in FIG. 1 a rotary earth boring drill bit 2 embodying the present invention. The drill bit 2 is fixedly attached to the lower end of a drill string 4. In a typical drilling operation, the bit 2 and drill string 4 are rotated with the bit 2 in contact with earth formations in a drilling operation.

The basic components of the drill bit 2 are a main body 6, three cutter bases 8, 10 and 12, and three cutters 14, 16, and 18. In the preferred embodiment, the cutters 14, 16 and 18 are conventional cone cutters having cutter teeth 20 on the outer surface of the cones. As the drill string 4 rotates, the cutters 14, 16 and 18 rotate with respect to the main body 6 and roll against earth formations with the teeth 20 chipping and grinding the earth. Also shown is an aperture 22 that is used to circulate drilling fluid (such as drilling mud) during drilling operations in a conventional manner.

Although the present invention is described in connection with a drill bit 2 having conventional cone cutters 14, 16 and 18 with cutter teeth 20, it is to be understood that the scope of the present invention is not limited to a particular type of cutter. It is contemplated that alternate embodiments of the present invention would include the use of any appropriate conventional cutter such as a conventional tungsten carbide insert type cutter.

Referring to FIG. 2, the drill bit 2 of the present invention is shown in detail as it would appear prior to final assembly. The main body 6 includes an upper portion 24 which is a threaded pin in the preferred embodiment used to threadedly attach the bit 2 to the drill string 4. The upper portion 24 of body 6 may be solid forged as part of body 6, or the upper portion 24 may be separately forged and welded to the surface 26 of the body 6.

The main body 6 has three generally downwardly facing hemi-cylindrical body surfaces of which body surfaces 28 and 30 are shown in FIG. 2. Surfaces 28 and 30 are also inclined with respect to horizontal where the drill bit 2 is vertically disposed facing downwardly as shown in FIGS. 1 and 2. Displaced below the body 6 are the cutter bases 8, 10 and 12 which have generally upwardly facing hemi-cylindrical base surfaces 32, 34 and 36, respectively. The base surface 32 and the body surface 28 are machined to be mating surfaces, and cutter base 8 is attached to main body 6 by fixedly attaching the base surface 32 to the body surface 28. The remaining two base surfaces and body surfaces are also mating surfaces, and the cutter bases 10 and 12 are likewise attached to the main body 6 of the drill bit 2. Preferably, the base surface 32 is welded to the body surface 28 by a beam of energy such as an electron beam.

An electron beam welder 38 is symbolically shown in FIG. 2 directing an electron beam 40 along the body surface 28. The cutter base 8 is mounted on body 6 by electron beam welding the base surface 32 to the body surface 28. As the two surfaces 28 and 32 are held in an abutting relationship, the electron beam is directed along the junction of the surfaces to weld the surfaces 28 and 32 together. The cutter bases 10 and 12 are likewise mounted on the main body 6 using the same welding technique. Although the present invention is described in connection with electron beam welding, it is contemplated that other suitable energy beam welding techniques may be used.

The inclined hemi-cylindrical body surfaces, such as surfaces 28 and 30, are thought to provide strength and performance characteristics superior to known drill bit construction. The inclination and the hemi-cylindrical configuration of surfaces 28 and 30 provide a large welding surface relative to the bit size. The large welding surface provides a strong weld joint. Also, the hemi-cylindrical configuration, itself, resists lateral forces. Forces parallel to the axis of the hemi-cylindrical configuration will constitute a sheer force on the weld joint. Forces along other directions will be resisted at least partially by the hemi-cylindrical configuration of the weld surface. Although, an embodiment is described having hemi-cylindrical body surfaces, it will be understood that other surface configurations, such as curved surfaces, elliptical surfaces, V-shaped surfaces, etc., may be substituted to perform the same function.

Referring to FIG. 3, a cross section of drill bit 2 is shown taken along line 3—3 of FIG. 1. In this view, cutter base 10 and cutter 16 are shown displaced from body 6 for illustration purposes, and it is also shown that body 6 includes an opening 42 extending through the upper and lower portions thereof. Although the present invention has been described in connection with a drill bit 2 having a full opening 42, it is to be understood that alternate embodiments of the present invention would include many conventional drill bits such as a jet type drill bit. The present invention is not limited in application to any specific type of rotary drill bit.

Referring to the displaced cutter base 10 shown in FIG. 3, a shoulder 44 is formed on cutter base 10 adjacent the base surface 34 and disposed between the base surface 34 and cutter 16. A corresponding recess 46 is formed in the body 6 to receive the shoulder 44. When the two surfaces 28 and 34 are being electron beam welded together, shoulder 44 will prevent the electron beam 40 from penetrating beyond the surfaces 28 and 34. The electron beam 40 is shown in FIG. 3 directed along the base surface 34 as it would appear during welding operations, and it is apparent that the shoulder 44 would prevent the electron beam from striking cutter 16. Each cutter base is similarly constructed with a shoulder to prevent damage to the cutters during welding.

The construction of drill bit 2 provides the advantage of changing the cutter axis of rotation to different angles for different cutters. In FIG. 3, the axis of rotation of cutter 16 is inclined at 35° from horizontal as depicted by axis line 48, but the bit 2 may be constructed to provide a wide range of angles for the cutter axis of rotation. Normally, the angle of the cutter axis of rotation varies between 33° and 36° from horizontal as depicted by angle A when the axis of rotation 49 of the drill bit 2 is in a vertical position. However, drill bits are known to have been constructed with the angle of cutter axis as great as approximately 39° from horizontal. Angle A may be varied by changing the base surface inclination angle B or the body surface inclination angle C. Since both base surface 34 and the body surface 28 are machined after the forging operation, the cutter bases and drill bit bodies are interchangeable to produce drill bits having cutter axes of rotation at varying angles by machining body surface 28 and base surface 34 at different angles of inclination.

Referring still to FIG. 3, the axis of rotation of cutter 16 may pass through the rotation axis 49 of the drill bit 2 or the cutter 16 may be rotated or offset slightly in a horizontal plane perpendicular to axis 49. The angular range of the cutter offset is typically from 0° to 4°. The offset angle of cutter 16 may be varied by making appropriate machining changes in surfaces 28 and/or 34.

Referring now to FIG. 4, a cross section of drill bit 2 is shown taken along the line 3—3 of FIG. 1 with cutter 16 removed for illustration purposes. It is apparent in this view that it would be difficult to mount cutter 16 after cutter base 10 had been attached to body 6 because the other previously mounted cutters would block the mounting path 50 of cutter 16. Therefore, the cutters 14, 16 and 18 are mounted before the cutter bases 8, 10 and 12 are mounted on body 6.

Cutter 16 is rotatably retained on base 10 by means of ball bearings 52 and mounted for rotation on roller bearings 54. A bearing pin 56 extends inwardly and downwardly from base 10 and includes an annular roller bearing channel 58 having a rectangular cross section and an annular ball bearing channel 60 having a semi-circular cross section. Both channels are machined on bearing pin 56.

Cutter 16 is machined to receive bearing pin 56 and includes a roller bearing race 62 circumscribing the roller bearing channel 58 and a ball bearing race 64 circumscribing the ball bearing channel 60 when cutter 16 is mounted. Disposed between the roller bearing channel 58 and race 62 are roller bearings 54, and likewise, disposed between ball bearing channel 60 and race 64 are ball bearings 52. Ball bearings 52 are introduced into the channel 60 and race 64 through bore 66 which is then sealed with a plug 68. In this manner cutter 16 and the remaining cutters are rotatably mounted on the bit 2.

It is to be understood that the scope of the present invention is not limited to any particular method or bearing apparatus for mounting a cutter, such as cutter 16, on a drill bit. It is contemplated that many types of bearing apparatus may be used in conjunction with the present invention. It would appear that journal bearings such as disclosed in U.S. Pat. Nos. 3,917,028 and 3,946,817 would be appropriate for use in the present invention.

As best illustrated in FIG. 2, the drill bit 2 is preferably manufactured by solid forging main body 6 and machining three generally downwardly facing body surfaces thereon, such as body surfaces 28 and 30. Three cutter bases 8, 10 and 12 are independently forged, and generally upwardly facing base surfaces 32, 34 and 36 are machined thereon to mate with the three body surfaces, such as body surfaces 28 and 30. Before mounting the cutter bases, the cutters 14, 16 and 18 are rotatably mounted on cutter bases 8, 10 and 12, respectively, and are oriented such that the cutters will face inwardly and downwardly when mounted on the main body 6. Cutter bases 8, 10 and 12 are then electron beam welded to main body 6 in the manner previously described, and the upper portion 24 of body 6 is threaded for attachment to drill string 4.

In this manner of construction, the cutters 14, 16 and 18 are positioned and supported with improved precision. This construction also allows the main body 6, the cutter bases 8, 10 and 12 and the cutters 14, 16 and 18 to be forged from different grades of steel to optimize performance characteristics of the bit 2. If the upper portion 24 of the main body 6 is forged separately and welded to the surface 26, then the upper portion may be constructed of a different grade steel. Although many grades of steel may be used, it is preferred to use grade 4140 steel for the main body 6; grade 8720 steel for the cutter bases 8, 10, and 12; grade 4817 steel for the cutters 14, 16 and 18 (standard AISI-SAE steel designations). It also is contemplated that grade 48XX and particularly 4815 steel would be well suited for use in the cutter bases. Using the present invention, each separate part of drill bit 2 may be constructed of the steel grade best suited for the particular function of the particular part. Thus, less expensive steel may be used for main body 6 than is used for cutter bases 8, 10 and 12. The present invention contemplates the use of many different grades of steels and metals chosen in accordance with appropriate design considerations and the scope of the invention should not be limited to any particular metal.

It will be understood that the scope of the present invention is not limited to the preferred embodiment described above, but is capable of numerous rearrangements, modifications, and substitution of parts and elements without departing from the scope of the present invention.

What is claimed is:

1. A method for manufacturing a rotary earth boring bit for use on a rotating drill string, said method comprising the following steps:

forging a unitary body for rotating on an axis of rotation including an upper portion and a lower portion;

machining three hemi-cylindrical body surfaces on the lower portion of said body spaced at 120° intervals around said body;

forging three cutter bases;

machining a cylindrical bearing pin having a center axis of symmetry on each of said bases;

machining a base surface on each of said bases to mate with one of said body surfaces;

machining a shoulder on said base disposed adjacent said base surface and adjacent the bearing pin;

machining an annular recess in each of the body surfaces and positioned to receive the shoulder of a cutter base;

rotatably mounting a cutter on said bearing pin; and electron beam welding each of said base surfaces to one of said body surfaces said cutter bases being oriented with said bearing pins extending inwardly with respect to the bit.

2. The method as set forth in claim 1 further comprising threading said upper portion of said main body for threadedly attaching said upper portion to the drill string.

3. The method as set forth in claim 1 wherein the hemi-cylindrical body surfaces are machined to form downwardly facing, including body surfaces.

4. The method as set forth in claim 3 wherein the cylindrical bearing surface and the hemi-cylindrical body surfaces are machined at an angle varying between 33° and 39° from horizontal where the drill string is taken as defining the vertical direction.

5. The method as set forth in claim 1 wherein the cutter bases and unitary body are forged of different grade steels.

* * * * *